June 14, 1949.    O. R. NEMETH    2,472,983
MOTION-PICTURE PROJECTOR
Filed Dec. 4, 1944    5 Sheets-Sheet 1

Inventor
Otto R. Nemeth
BY
R. J. Schwarz
Attorney.

June 14, 1949.　　　　O. R. NEMETH　　　　2,472,983
MOTION-PICTURE PROJECTOR
Filed Dec. 4, 1944　　　　　　　　　　　　　　5 Sheets-Sheet 2

Inventor
Otto R. Nemeth
BY
R. J. Schwarz
Attorney.

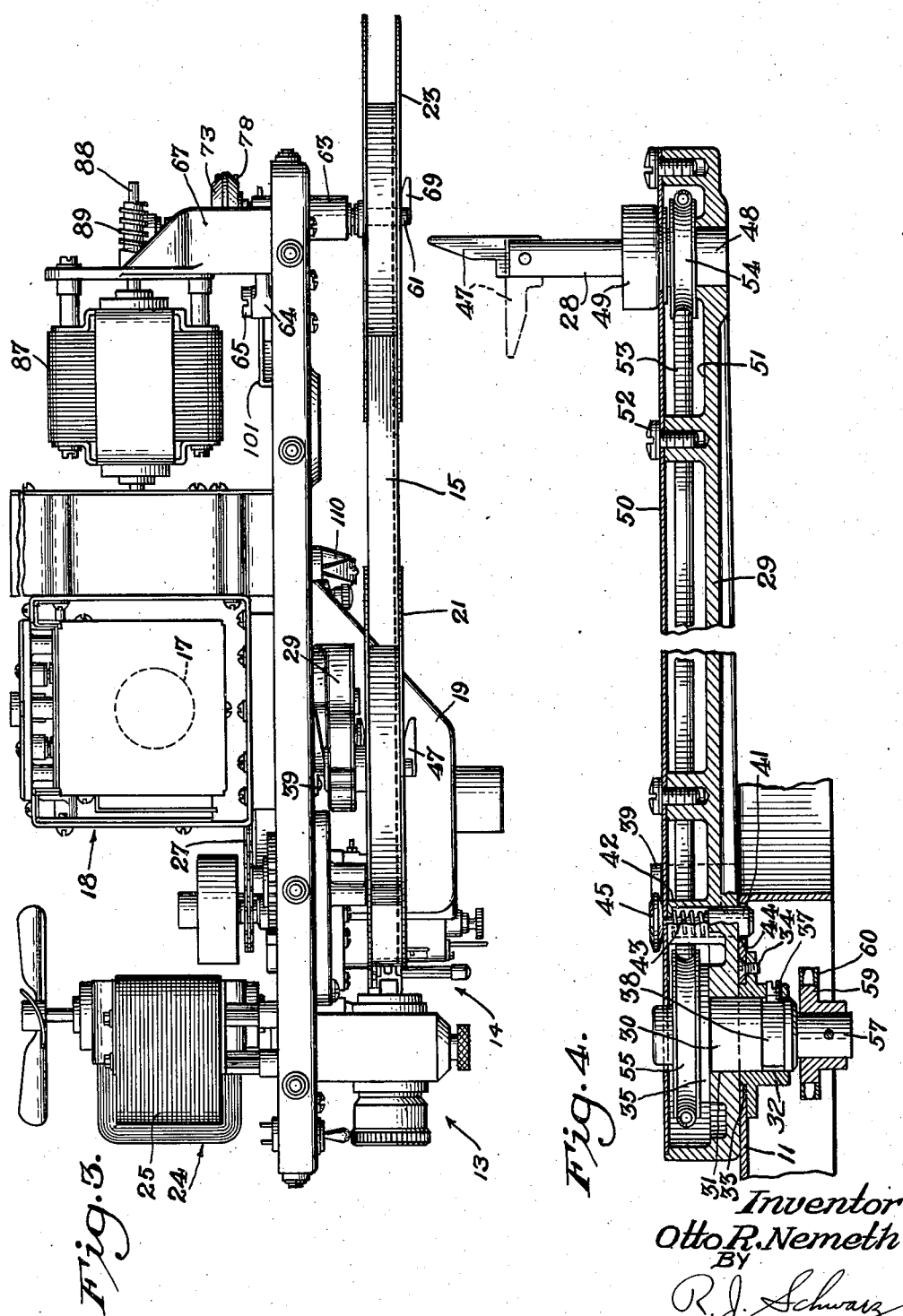

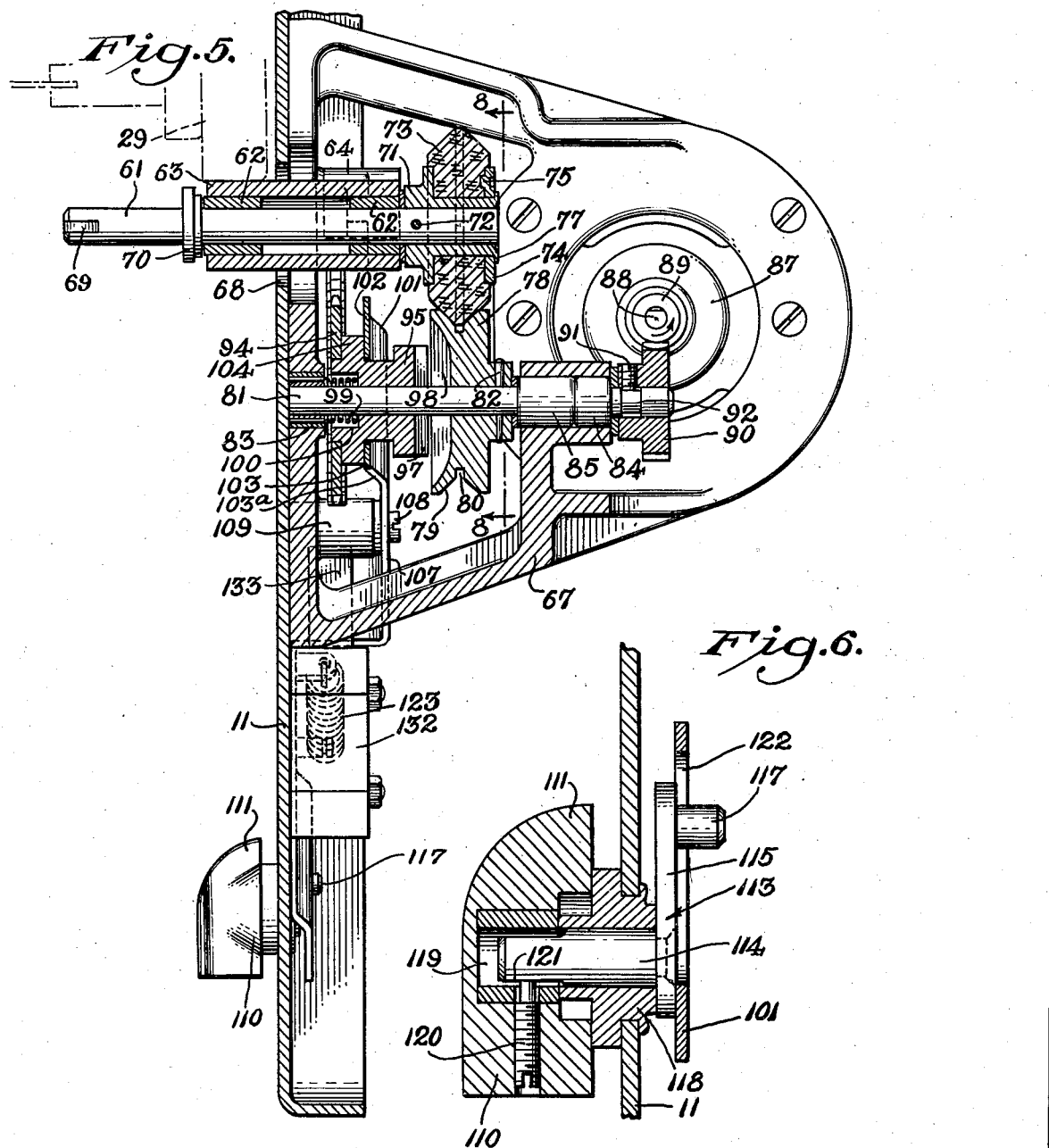

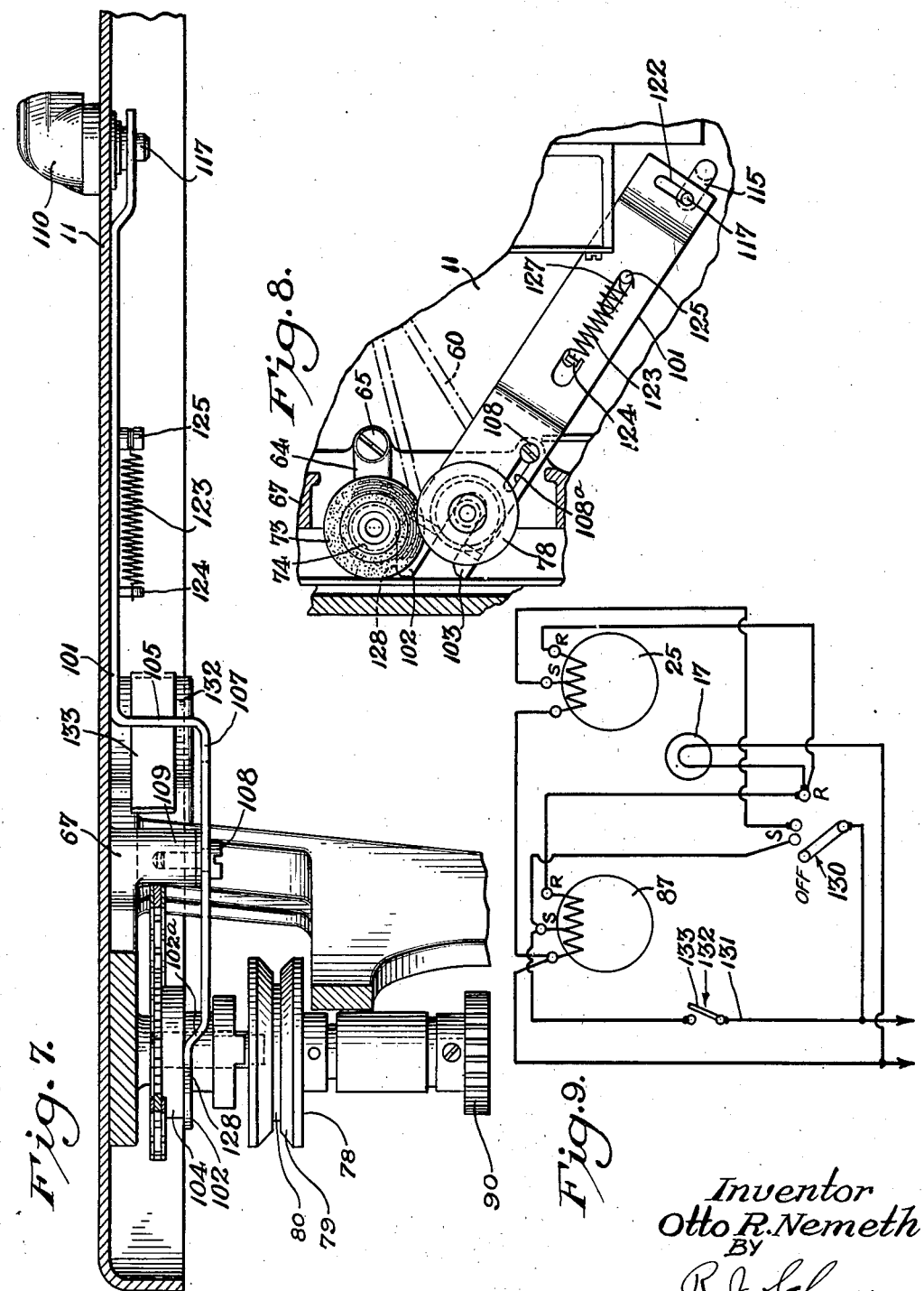

Patented June 14, 1949

2,472,983

UNITED STATES PATENT OFFICE 2,472,983

MOTION-PICTURE PROJECTOR

Otto R. Nemeth, Chicago, Ill., assignor, by mesne assignments, to Helene Curtis Industries, Inc., a corporation of Illinois Application December 4, 1944, Serial No. 566,541

2 Claims. (Cl. 242—55)

The present invention relates to improvements in motion picture projectors and more particularly concerns the film handling means for such projectors.

An important object of the present invention is to provide in a motion picture projector an improved film handling mechanism having supply reel and take-up reel mechanisms operating in an especially advantageous integrated relationship for film take-up during running of the projector and for rewinding of the film after the film has run out onto the take-up reel.

Another object is to provide a novel positive acting, load-compensated constant torque operating means for the take-up reel.

A further object of the invention is to provide an improved film rewinding mechanism.

Still another object is to provide novel changeover means for converting the film feeding and take-up apparatus of a motion picture machine quickly and alternatively for rewinding.

Yet another object of the invention is to provide improved means for supporting the film reels in a motion picture projector.

Other objects, features and advantages of the invention will be readily apparent from the following detailed description of an exemplary embodiment of the invention taken together with the accompanying five sheets of drawings illustrating the same and in which:

Fig. 3 is a top plan view of the main panel and supported mechanisms.

Fig. 4 is an enlarged fragmental sectional detail view taken substantially along the line 4—4 of Fig. 1.

Fig. 5 is an enlarged sectional detail view taken on substantially the line 5—5 of Fig. 2.

Fig. 6 is an enlarged sectional detail view taken on substantially the line 6—6 of Fig. 1.

Fig. 7 is an enlarged sectional detail view taken substantially in the plane of line 7—7 of Fig. 2.

Fig. 8 is a vertical sectional detail view taken substantially in the plane of line 8—8 of Fig. 5.

Fig. 9 is a wiring diagram of the electrical circuit by which operation of the projector, and in particular the film handling mechanism thereof is controlled.

Figure 1:
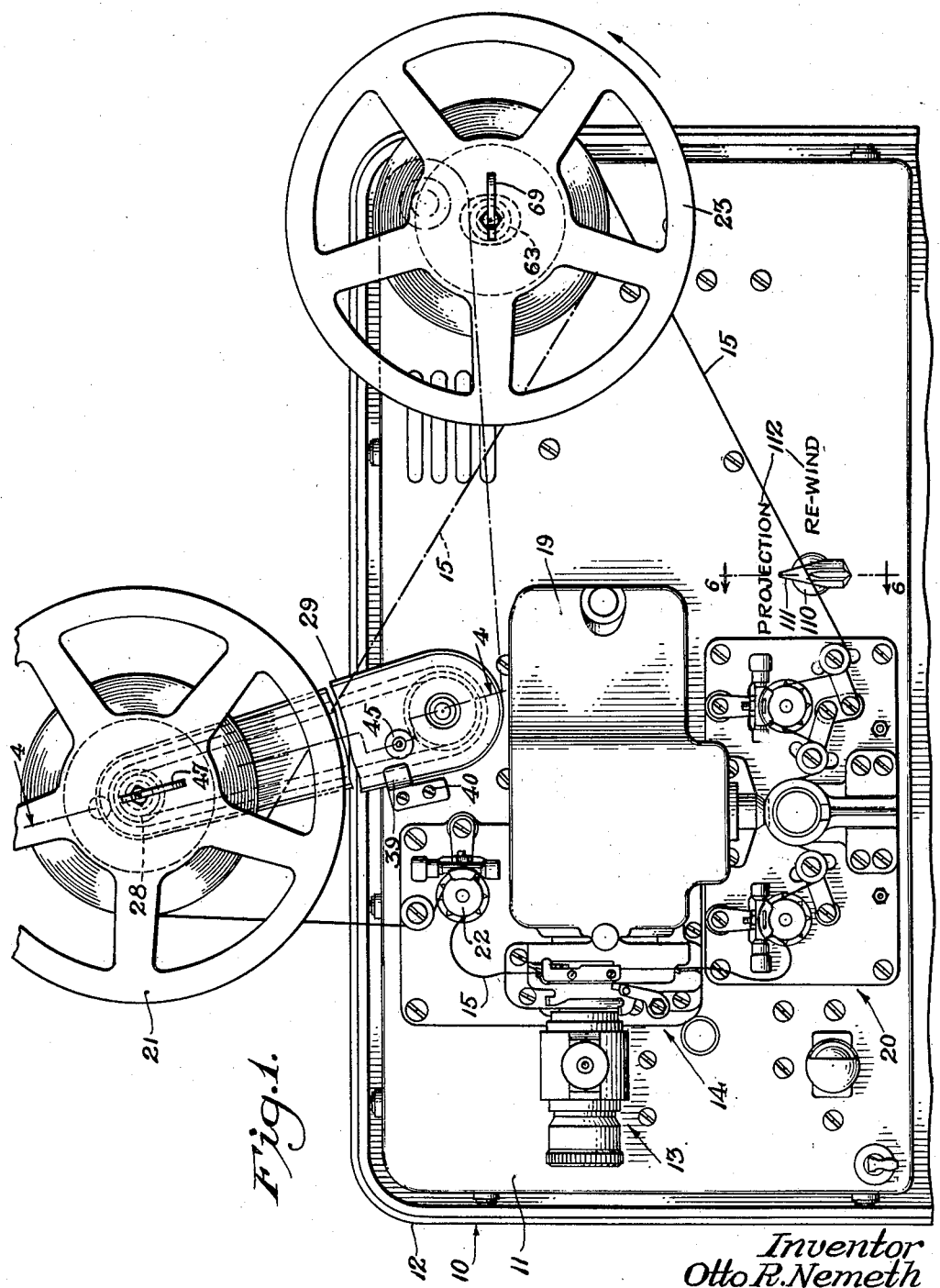
Figure 1 is a side elevational view of the projection side of a motion picture projector embodying the features of my invention.

Having more particular reference to the drawings, an exemplary motion picture projector 10 embodying the features of my invention is shown as of the portable or "home movie" type equipped with a main mounting panel 11 which carries all of the apparatus and attachments involved in the physical operation of projecting a motion picture and which is adapted to be supported in vertical position within a carrying case 12. The mounting panel 11 carries adjacent to its forward end a projection lens unit 13 rearwardly of which is mounted a film gate 14. Through the film gate is adapted to be threaded a motion picture film strip 15 to receive therethrough a concentrated projection light beam from a light source such as a lamp 17 (Fig. 3) carried within a lamp housing 18 (Figs. 2 and 3) which is located at the inside of the mounting panel. Light from the lamp 17 is concentrated and transmitted for projection purposes by an optical system (not shown) at least in part inclosed by a cover 19 mounted at the projection side of the mounting panel (Fig. 1). After passing through the film gate 14, the film 15 may be conducted through a sound head 20.

Figure 2:
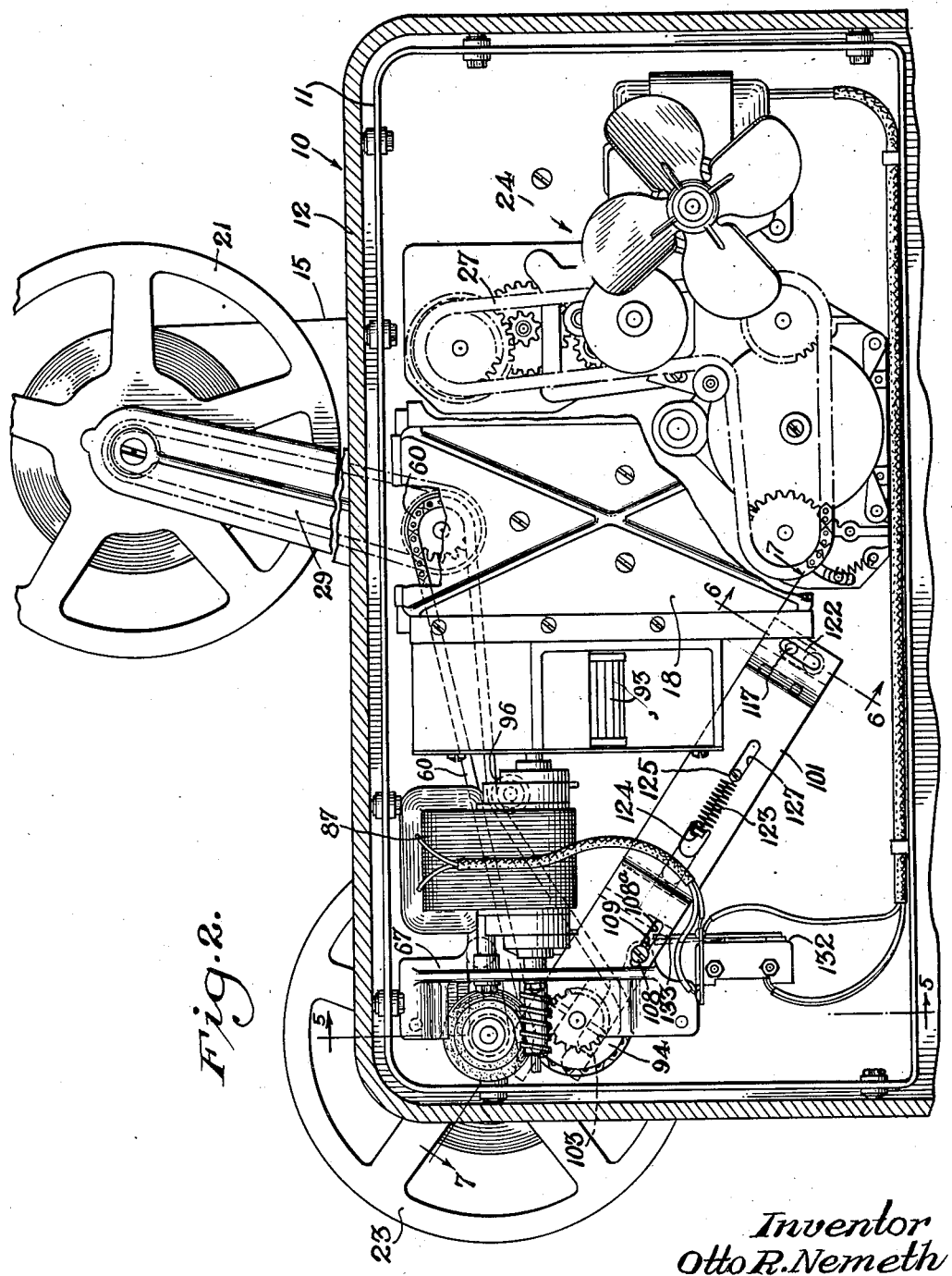
Fig. 2 is an elevational view of the inner or reverse side of the main mounting panel of the projector.

Before projection, the film strip 15 is contained upon a feed or supply reel 21 from which it is drawn in the operation of the projector by a feed sprocket 22 (Fig. 1). After leaving the sound head 20, the film strip 15 is wound upon a take-up reel 23. Smoothly coordinated advance of the film strip 15 is accomplished by a unitary drive 24 including a motor 25 which motivates a gear train and a film-sprocket-synchronizing chain 27 (Figs. 2 and 3).

According to the present invention, the mounting and operation of the supply reel 21 and the take-up reel 23 are correlated in an improved manner for film feeding and rewind purposes and for ease and simplicity of control, and the construction is such that an unusually compact and efficient arrangement is secured. To this end the means for operatively mounting both of the reels is carried by the mounting panel 11 in such a manner that when the reels are dismounted all of the reel mounting means will either lie entirely within or can be quickly and conveniently located within the confines of the case 12 without requiring any disassembly to enable closing of the outer side of the mounting panel 11 by a removable cover (not shown) as is desirable to protect the projection apparatus for transportation or storage.

Accordingly, the supply reel 21 is preferably adapted to be operatively mounted upon a stud shaft spindle 28 carried by a supporting arm 29 (Figs. 1, 2 and 4), adapted to project upwardly from the top of the mounting panel 11 adjacent to the film feeding sprocket 22 sufficiently to hold the reel peripherally clear of the sprocket. The supply reel arm 29, however, is mounted to be swung down from an operative position as shown in full outline (Fig. 1) to an out of the way or collapsed position within the confines of the case 12 as shown in broken outline in Fig. 1. For this, the arm 29 is preferably rockably mounted adjacent to its lower end, as best seen in Figs. 1 and 4, upon a tubular stud 30 extending from the upper part of the front face of the mounting panel 11. For convenience in assembly and efficiency in operation, the stud 30 is formed as a short cylindrical shaft extending through a bearing opening 31 in the arm 29 and slidably into a flange 32 which extends through an opening 33 in the panel 11 and is secured to the panel as by means of screws 34. To retain the arm 29 against axial displacement, the stud 30 is formed with an integral retaining flange 35 at its outer end. After the stud 30 has been assembled with the arm 29 and then with the flange 32, one or more set screws 37 threaded radially through the flange 32 are driven bindingly against the stud 30 within a radial groove 38 which, as shown, is preferably wider than the set screws in order to permit proper axial adjustment in assembly for free swinging of the arm 29 between the face of the panel 11 and the retaining flange 35.

Determinative of the fully extended or upwardly projecting position of the supply reel arm 29 is a bracket 39 which may be secured in any preferred manner as by means of screws 40 to the mounting panel 11 forwardly of the predetermined position to be assumed by the extended arm 29 and preferably in such relationship that the arm 29 will lean forwardly into the bracket. Thereby the weight of the arm 29 plus the weight of the supply reel 21 and the film carried thereby will tend at all times to hold the arm in the bracket 39 and minimize any tendency of the arm to swing back toward collapsed position during operation.

Further assurance against reverse swinging of the arm 29 during operation is afforded by a spring-urged locking plunger 41 which is carried by an outwardly projecting boss 42 on the arm 29. The plunger projects normally inwardly under the influence of a spring 43 to extend through a socket 44 provided therefor in the face of the mounting panel 11 and adapted to register with the detent 41 in the fully extended or operating position of the arm 29. To release the supply reel arm 29 for collapsing, the detent 41 is retracted by manipulating the head 45 thereon at the outer side of the arm.

Restrained paying out of the film 15 from the supply reel 21, permitting the film to be withdrawn without strain by the supply sprocket 22 but nevertheless preventing overrun of the reel 21, is effected by rotary mounting of the supply spindle 28 and the application of frictional braking force thereto by means which may also be actuated for rewinding the film upon the supply reel. Accordingly, the supply reel 21 is adapted to be keyed upon the spindle 28 as by means of a pivoted keying latch 47. This latch is adapted to be swung open to the full line position in Fig. 4 in order to receive or release the reel, or into the dot-dash position of Fig. 4 (full line position in Fig. 3) to lock the reel against axial displacement and also for joint rotation with the spindle.

A rotary mounting for the spindle is provided by spaced bearings 48 and 49 of which the bearing 48 is supported directly by the main body of the supply reel arm 29 and the bearing 49 is supported by a removable cover plate 50. The cover plate 50 is provided for closing a chamber 51 within the arm 29 and is secured in place by means such as screws 52.

Within the chamber 51 is a flexible belt 53 which may be of the closely coiled spring type. A pulley 54 secured upon the inner end portion of the stud shaft 28 has the flexible belt 53 looped thereover. The belt is also looped over and is maintained under driving tension by a driving pulley 55 carried by a shaft 57 which is rotatably supported within the tubular arm-supporting stud 30. Through this arrangement when the driving pulley 55 is held stationary or substantially so, a corresponding frictional drag is imposed upon the pulley 54 and thus upon the supply reel spindle 28. This condition preferably prevails during the projection of a moving picture in the course of which film is withdrawn from the supply reel 21. On the other hand rewinding of the film strip 15 upon the supply reel 21 can be effected rapidly by actuation of the driving pulley 55 to drive the flexible belt 53 and thereby the spindle pulley 54 to rotate the spindle 28 and the supply reel 21 for rewinding. Driving power is adapted to be transmitted to the driving pulley shaft 57 through a sprocket 59 secured fixedly upon the inner end portion of the shaft and having a transmission sprocket chain 60 meshing therewith.

During projection of a motion picture, the drive chain 60 is maintained inactive and under at least a certain degree of braking restraint so as to have a braking effect upon the supply reel 21 as described. At the same time the take-up reel 23 is positively driven to wind up the film 15 thereon as it leaves the sound head 20.

As an important feature of the invention, the drive for the take-up reel 23 involves the application of a constant driving torque which results in a constant but non-damaging tension upon the film being rewound. Furthermore, the rewind tensioning torque is maintained substantially uniform irrespective of the weight of film reeled upon the take-up reel 23 or possibly the halting delivery of film. For instance, should the film at any time come to a stop for any reason or for any length of time while the take-up is in operation, the take-up tension will not increase appreciably but will be maintained constantly and take-up resumed instantly upon release of the film strip from the stoppage. To this end, the take-up reel 23 is adapted to be supported by a take-up shaft 61 (Fig. 5) which is rotatably journaled in spaced bearings 62 mounted within a hub 63 on a rocker arm 64 (Figs. 5 and 8). In the present instance the rocker arm extends in a forward direction and is rockably secured as by means of a screw 65 to a supporting member 67 which herein is a casting mounted upon the inner face of the mounting panel 11. The hub 63 is of such length as to extend to a limited extent beyond the outer face of the mounting panel 11 through a vertical rocking-clearance slot 68. In this way the outer end portion of the rocker hub 63 provides a rest for the supply reel arm 29 when the latter is in the collapsed condition indicated in broken outline in Figs. 1 and 5.

The take-up reel shaft 61 has a latch 69 which interlocks with the take-up reel 23 to effect joint rotation of the reel and shaft. The longitudinal position of the take-up reel shaft 61 in the rocker hub 63 is maintained by a collar 70 fast upon the shaft adjacent the outer end of the hub and a flanged member 71 secured as by means of a taper pin 72 to the inner end portion of the shaft.

In the attainment of the constant take-up tension, a frictional overrunning drive is provided for the take-up reel shaft 61. Accordingly, a friction roller 73 is mounted on the flanged member 71 serving as its hub. The material of the roller 73 should be selected for moderate frictional qualities but yet the ability to slip relative to a relatively non-friction driving member without undue wear. It should also be possessed of a sufficient degree of firmness to retain a preferred profile under a substantial load in operation. Very excellent results in practice have been attained with rollers made from compressed ground cork bonded to provide a reasonably solid though sufficiently resilient roller mass capable of withstanding all of the stresses and strains to which the roller is subjected in use. Such a roller can, as best seen in Fig. 5, be mounted upon the hub 71 by clamping the hub portion thereof between the flange of the hub and a retaining flange 74 which may have roller-penetrating non-rotation gripping indentations 75 and is adapted to be locked in place by means such as a peened flange or upsetting 77 on the adjacent end of the hub. Maximum frictional interengagement of the friction roller 73 with a driving roller 78 is afforded by a substantially taper-wedge peripheral contour of the friction roller 73 for engagement with a complementary V-groove 79 in the roller 78. The root of the V-groove 79 is preferably formed as a relief groove 80 for accommodating the extreme peripheral projection of the friction roller 73 under compressive load within the V-groove and also to accommodate the extreme periphery as the friction roller wears down after long use.

By preference the driving roller 78 is formed from a material which will present a hard relatively smooth surface within the V-groove 79. Chromium plated brass or steel has been found quite satisfactory but a plastic material presenting an adequately smooth surface is also practicable.

In the preferred arrangement, the driving roller 78 is mounted vertically below the friction roller 73 and at such an elevation that the full weight of the take-up reel 23 and of any variable quantity of film thereon is carried directly by the drive roller through the medium of the friction roller 73. Accordingly, the drive roller 78 is mounted upon a drive shaft 81 to which it may be secured fixedly as by means of a taper pin 82. Bearings 83 and 84 in spaced relation at opposite sides of the drive roller and carried by the supporting bracket casting 67 support the drive shaft 81 rotatably at an elevation predetermined to maintain the driving periphery of the drive roller 78 at a height designed to hold the rocker arm hub 63 clear of the bottom of the slot 58 but sufficiently below the top of the slot to enable optional upward rocking of the rocker arm 64 to carry the friction roller 73 clear of the drive roller 78. A spacer 85 adjacent to the bearing 84 is adapted to hold the hub of the drive roller 78 clear of the supporting bracket 67.

While the projector is running, the take-up reel 23 is driven continuously with the preferred tensioning torque by actuation of the driving roller 78 at a speed which overruns the friction roller 73 and thereby the take-up reel, the running speed of which is dependent upon the lagging rate at which film is delivered by the feed sprocket 22 and the coordinated sound head sprockets. As a result, the drive roller 78 slips relative to the interengaging traction surfaces of the friction roller 23. Hence, the frictional characteristics of the friction roller 73 will assure that the tensioning torque of the take-up reel continues constant and without any tendency toward backlash should anything cause the film 15 to be delivered jerkily to the take-up reel. Furthermore, as the inertia of the take-up reel increases due to accumulating load of film during operation, the increased weight causes the proportionately greater traction of the friction roller 73 upon the drive roller 78. This compensates for the increased inertia and assures constant positive take-up torque.

A power drive for the drive roller shaft 81 is provided herein by a motor 87 carried by the supporting bracket 67 and having a through shaft 88 upon one end of which is a worm 89 meshing with a worm gear 90 secured upon the drive shaft 81 as by means of one or more set screws 91 secured within an annular keying groove 92 in the shaft. At its opposite end the motor shaft 88 carries an exhaust blower type fan 93 (Fig. 2) for creating a cooling circulation of air through the lamp housing 18.

At the conclusion of a projection interval, rewinding of the film from the take-up reel 23 to the supply reel 21 is, according to the present invention, effected by disconnecting the take-up friction roller 73 from the drive roller 78 and establishing a driving connection for the rewind driving chain 60 with the drive shaft 81. For this purpose the rewind chain 60 is engaged over a drive sprocket 94 carried by a clutch element 95 which is slidably carried by the drive shaft 81 between the drive roller 78 and the bearing 83. A tensioning roller 96 engages the chain 60 at a point between the sprockets 59 and 94. Ample clearance is afforded to permit axial sliding of the clutch element 95 to carry a diametral clutch tooth 97 thereon into or out of clutching engagement within a complementary diametral clutch slot 98 provided in the opposing face of the drive roller.

Means for normally urging the clutch element 95 toward clutching interengagement with the drive roller 78 may comprise a coiled compression spring 99, bearing at one end against the adjacent end of the bearing 83 and driving against the clutch element 95 within an appropriate socket 100. Opposing the spring 99 to hold the clutch element 95 inactive in declutched position while the apparatus is in take-up operation is means such as a control lever 101. This lever has a pair of declutching fingers 102 and 103 straddling the clutch element 95 and adapted to engage a radial flange 104 at the spring end of the clutch element with declutching effect in opposition to the spring 99 (Figs. 5, 7 and 8).

By preference, the clutch actuating lever 101 is formed as an elongated plate slidably engaging the inside face of the mounting plate 11 and formed intermediate its end with a right angular offsetting flange 105. This provides a head section 107 which clears the supporting bracket 67 and carries the offset declutching fingers 102 and 103 as best seen in Figs. 5 and 7 and which are joined to the head section by declutching cams 102a and 103a. Means such as a screw 108 extending through a longitudinal guide slot 108a in the head section 107 is threaded into a boss 109 provided on the bracket 67 for defining the proper operative plane for the head section 107 and thereby the declutching fingers 102 and 103.

Thus, shifting of the declutching member 101 longitudinally to carry the declutching fingers 102 and 103 beyond the opposing clutch flange 104 effects release of the clutch by permitting movement of the clutch flange 104 into the clearance provided by the head section 107 inwardly of the declutching cams 102ª and 103ª, as seen in Fig. 8.

Means for actuating the clutch lever 101 preferably comprises a knob 110 having an operative connection with the lever adjacent to its end remote from the declutching fingers. For this purpose, the knob 110 is conveniently located for manipulation at the front of the mounting plate 11 and is formed with a pointer 111 adapted to indicate the operative position of the device with relation to appropriate indicia on the front of the mounting panel, such for example as appropriate wording 112. In the present instance, this indicia comprises the word "Projection" toward which the pointer 111 extends when the lever 101 as is in the declutching position, and the word "Rewind," indicative when the pointer is directed thereto of the clutch-releasing condition of the lever.

As seen in Fig. 1, the knob 110 is preferably located in a position directly behind the path of travel of the film 15 from the sound head 20 to the take-up reel 23. As a result, the take-up reach of the film 15 serves as a guard or at least reminder to the operator to forestall accidental or absent minded manipulation of the knob 110 while there is yet film to be taken up. This is especially advantageous where at the conclusion of a moving picture the trailing leader has not yet left the sound head 20.

An operative connection between the knob 110 and the clutch lever 101 is effected through the medium of a crank 113 (Figs. 2, 6 and 7) which comprises a crank shaft 114, a crank arm 115 riveted to one end of the crank shaft and a crank pin 117. The crank shaft 114 extends outwardly through the mounting panel 11 through a bushing flange 118 and into a bushed shaft hole 119 in the knob 110 where a detachable connection with the shaft is afforded by means such as a set screw 120 engaging a flat 121 on the shaft. Interengagement of the crank pin 117 with the clutch lever 101 is effected by projection of the crank pin through a crank pin follower slot 122 which in the present instance is disposed perpendicularly to the longitudinal axis of the clutch lever and in such relation to the crank 113 that when the knob 110 is turned from the "Projection" position to the "Rewind" position, the clutch lever 101 will be shifted completely from the declutching to the clutch-releasing position by the action of the crank pin 117 in the follower slot 122.

The relationship of the crank pin 117 to the follower slot 122 is such, moreover, that when the knob 110 has been turned to the "Rewind" position the crank arm 115 extends parallel or a little over-center relative to the axis of the clutch lever and positively holds the clutch lever against the action of return biasing means such as a spring 123 (Fig. 8). As best seen in Figs. 2, 5, 7 and 8, the return spring 123 may be a coiled tension spring hooked onto a spring anchoring lug 124 struck out integrally from the body of the clutch lever 101. The opposite end of the spring 123 is hooked onto a stop pin 125 fixedly supported by the mounting plate 11 and extending through a longitudinal slot 127 in the clutch lever. The spring 123 is maintained under such tension that it continuously urges the clutch lever 101 toward declutching position and therefore acts to snap the clutch lever 101 back into declutching position when the clutch lever 101 is released from the clutch-releasing position by swinging of the crank pin 117 from the clutch releasing position.

In addition to its function as a clutch operator, the lever 101 acts as the medium for effecting separation of the friction roller 73 and the drive roller 78 as an incident to conditioning of the apparatus for rewinding. Accordingly, the clutch lever 101 is disposed at such an angle preferably diagonally upwardly that a cam edge 128 at the top of the declutching finger 102 clears the adjacent underface of the rocker arm hub 63 when the clutch lever is retracted to the declutching position but enters into lifting engagement with the rocker arm hub to lift it slightly but sufficiently to clear the friction roller 73 from the drive roller 78 when the clutch lever is in clutch-releasing position. As a result, the same turning manipulation of the knob 110 which releases the clutch for rewinding also disconnects the take-up drive from the reel 23 and forthwith converts it into a rewind drive acting through the clutch element 95, the sprocket 94, the rewind chain 60, the driven rewind sprocket 59 (Fig. 4), the drive pulley 55, the flexible drive belt 53 and the driven pulley 54 to drive the supply reel shaft 28 and thereby the supply reel 21 at a relatively rapid rate for rewinding the film 15 thereon. During the rewinding, the take-up reel 23 rotates freely with the take-up reel shaft 61 in response to pull of the rewinding film 15 which has in the meantime been reconnected with the supply reel 21 as indicated in broken outline in Fig. 1.

Upon completion of the rewinding and return of the knob 110 to the "Projection" position to cause resumption of the declutching position by the clutch lever 101, the declutching fingers 102 and 103 acting frictionally on the clutch flange 104 and the compressed clutch spring 99 acting frictionally in opposition operate upon the sprocket-carrying clutch element 95 as a brake. This holds the rewind driving chain 60 and thereby the driving pulley 55 virtually stationary to afford a drag upon movement of the flexible driving belt 53 and thus upon the pulley 54 and the supply reel shaft 28. The supply reel 21 is thus restrained against overrunning during feeding of the film.

Operation of the projection lamp 17, the film driving motor 25, and the exhaust and take-up drive motor 87 is preferably correlated through an electrical circuit controlled by a master switch 130 (Fig. 9) which may be a three position switch as shown. That is, the switch 130 has an "off" position in which the projection lamp and motor are non-operative, a "starting" position which is therein provided for the benefit of the motors, and a running position assumed when the motors are up to speed and coincident with which the projection lamp is switched on. After the film 11 has run out and is entirely taken up by the reel 23 the switch 130 is turned off and the projector comes to a standstill.

Inasmuch as it is unnecessary, if not actually undesirable, to have the entire projector running while the film is being rewound upon the supply reel 21, means is provided for operating only the exhaust and take-up drive motor 87 for actuation of the film take-up and rewind drive. To this end, a supplementary circuit including a line 131 is connected with the master switch 130 and the exhaust and take-up drive motor 87 and is equipped with a normally open switch 132 having an operating lever 133 which is adapted to be swung into the closed switch position during the rewind period. An efficient mode of operating the switch lever 133 comprises, as shown in Figs. 2 and 5, having the switch unit 132 mounted upon the rear of the mounting plate 11 with the switch arm 133 disposed in the path of the shoulder of the clutch lever offsetting flange 105. Thus, when the clutch lever 101 is shifted, as shown in dotted lines in Fig. 2, into the clutch-releasing position incident to initiation of a rewinding operation, the switch arm 133 will be moved into the closed switch position and complete the auxiliary circuit 131 to energize the exhaust and take-up drive motor 87. The relationship of the switch arm 133 to the lever shoulder is such that the lever will have moved throughout practically its full clutch-releasing and friction roller lifting stroke before the switch arm is actuated to close the switch. This assures that the apparatus is fully set for operation by the time the motor 87 is energized.

As soon as the rewinding operation has been completed, the knob 110 is turned back to the "Projection" position whereupon the clutch lever 101 shifts to the declutching position wherein the switch 132 automatically opens and the friction roller 73 drops into active interengagement with the grooved driving roller 78, and the projector is again in condition to resume operation when the master switch 130 is actuated to energize the motors 25 and 87 and the projection lamp 17.

While I have illustrated and described in detail a preferred embodiment of my invention, I contemplate that various modifications, substitutions and alternative constructions may be effected without departing from the spirit and scope of the invention as defined in the appended claims.

I claim:

1. In combination in a motion picture projector, a vertical mounting panel, a supply reel shaft, a horizontal take-up reel shaft mounted for vertical movement, a drive shaft, means on said take-up reel shaft and said drive shaft cooperating to provide a separable driving connection effective through gravitational inclination of the take-up reel shaft toward the drive shaft, a drive motor in gear with said drive shaft, and electrical motor circuit including a master switch and a normally open auxiliary switch having an operating arm, means for effecting a rewind driving connection for said supply reel shaft with said drive shaft including means fixed upon the drive shaft and a clutch member axially slidable on said drive shaft and normally biased toward clutching interengagement with said fixed means, and a manually operable elongated rectilinearly reciprocable member including means for holding said clutch member inactive during film take-up operation but releasable from the clutch member upon rectilinear movement in one direction to effectuate the rewind driving connection for said supply reel shaft, said reciprocable member having means operable simultaneously with clutch release for engaging and lifting said take-up reel shaft away from said drive shaft and separating the driving connection therewith and means acting at the same time to motivate said operating arm for closing said auxiliary switch.

2. In combination in a motion picture projector, a vertical mounting panel, a supply reel shaft, a horizontal take-up reel shaft mounted for vertical movement, a drive shaft, means on said take-up reel shaft and said drive shaft cooperating to provide a separable driving connection effective through gravitational inclination of the take-up reel shaft toward the drive shaft, a drive motor for said drive shaft, an electrical motor circuit including a master switch and a normally open auxiliary switch having an operating arm, means for effecting a rewind driving connection for said supply reel shaft with said drive shaft including means fixed upon the drive shaft and a clutch member axially slidable on said drive shaft and normally biased toward clutching interengagement with said fixed means, and a member including means for holding said clutch member inactive during film take-up operation but releasable from the clutch member upon movement in one direction to effectuate the rewind driving connection for said supply reel shaft, said member having means operable simultaneously with clutch release for moving said take-up reel shaft away from said drive shaft and separating the driving connection therewith and means acting at the same time to motivate said operating arm for closing said auxiliary switch.

OTTO R. NEMETH.

REFERENCES CITED

The following references are of record in the file of this patent:

UNITED STATES PATENTS

| Number | Name | Date |
|---|---|---|
| 1,001,448 | Riley | Aug. 22, 1911 |
| 1,277,559 | Emory | Sept. 2, 1918 |
| 1,299,566 | Emory | Apr. 8, 1919 |
| 1,468,499 | Frangos | Sept. 18, 1923 |
| 1,827,893 | Kindelmann et al. | Oct. 20, 1931 |
| 1,846,004 | Green | Feb. 16, 1932 |
| 1,944,029 | Foster | Jan. 16, 1934 |
| 1,979,800 | Howell | Nov. 6, 1934 |
| 2,064,088 | Stechbart | Dec. 15, 1936 |
| 2,067,893 | De Vry | Jan. 19, 1937 |
| 2,099,299 | Fritts | Nov. 16, 1937 |
| 2,207,075 | Sperry | July 9, 1940 |
| 2,212,617 | Otto | Aug. 27, 1940 |
| 2,351,005 | Camras | June 13, 1944 |
| 2,358,692 | De Vry | Sept. 19, 1944 |

FOREIGN PATENTS

| Number | Country | Date |
|---|---|---|
| 329,804 | Germany | Nov. 29, 1920 |